United States Patent
Wellnitz

(10) Patent No.: US 7,649,175 B2
(45) Date of Patent: Jan. 19, 2010

(54) ANALOG TO DIGITAL CONVERSION SHIFT ERROR CORRECTION

(75) Inventor: Donald R. Wellnitz, Fitchburg, WI (US)

(73) Assignee: Koninklijke Philips Electronics N.v., Eindhoven (NL)

( * ) Notice: Subject to any disclaimer, the term of this patent is extended or adjusted under 35 U.S.C. 154(b) by 579 days.

(21) Appl. No.: 10/597,019

(22) PCT Filed: Jan. 5, 2005

(86) PCT No.: PCT/IB2005/050043

§ 371 (c)(1),
(2), (4) Date: Jul. 6, 2006

(87) PCT Pub. No.: WO2005/069040

PCT Pub. Date: Jul. 28, 2005

(65) Prior Publication Data

US 2009/0020704 A1   Jan. 22, 2009

Related U.S. Application Data

(60) Provisional application No. 60/536,075, filed on Jan. 13, 2004.

(51) Int. Cl.
G01T 1/20       (2006.01)
G01T 1/161      (2006.01)
(52) U.S. Cl. ............... 250/362; 250/252.1; 250/361 R; 250/363.09; 382/131
(58) Field of Classification Search .......... 250/362, 250/361 R, 363.07, 363.09; 382/131
See application file for complete search history.

(56) References Cited

U.S. PATENT DOCUMENTS

| 5,371,362 | A |   | 12/1994 | Mestais et al. |
| 5,781,142 | A |   | 7/1998  | Onodera et al. |
| 5,872,363 | A | * | 2/1999  | Bingham et al. ....... 250/363.01 |
| 6,252,232 | B1|   | 6/2001  | McDaniel et al. |
| 6,291,825 | B1|   | 9/2001  | Scharf et al. |
| 6,374,192 | B1|   | 4/2002  | Brogle et al. |
| 6,470,285 | B1|   | 10/2002 | Atwell |
| 6,603,125 | B1| * | 8/2003  | Cooke et al. ................. 250/369 |
| 6,635,878 | B2|   | 10/2003 | Bertelsen |
| 2003/0042423 | A1 |   | 3/2003 | Bertelsen |
| 2003/0116713 | A1 |   | 6/2003 | Cooke et al. |
| 2003/0213913 | A1 | * | 11/2003 | Moyers et al. .............. 250/369 |
| 2005/0109958 | A1 | * | 5/2005 | Vernon ........................ 250/526 |

FOREIGN PATENT DOCUMENTS

| EP | 0 706 065 A2 | 4/1996 |
| EP | 1 104 890 A2 | 6/2001 |
| EP | 1 148 348 A2 | 10/2001 |

\* cited by examiner

*Primary Examiner*—David P Porta
*Assistant Examiner*—Casey Bryant

(57) ABSTRACT

A method for correcting energy values of pulses from a nuclear medicine camera for errors due to Analog to Digital conversion shift includes determining a relationship between a subset of samples selected from a set of samples from the pulse, the relationship being expressed in the form of a code. A conversion table is accessed which provides a list of codes and corresponding conversion factors. The conversion factor for the closest code to that of the subset of samples is selected from the table and applied to an integration of the set of samples to correct the energy value of the pulse.

18 Claims, 2 Drawing Sheets

ANALOG TO DIGITAL CONVERSION SHIFT ERROR CORRECTION

CROSS REFERENCE TO RELATED APPLICATIONS

This application claims the benefit of U.S. provisional application Ser. No. 60/536,075 filed Jan. 13, 2004, which is incorporated herein by reference.

The present application relates to the digital processing arts. The invention finds particular application in connection with a technique for correction of inconsistencies arising during pulse integration in analog to digital converters in nuclear medicine due to shifts in the timing of samples and will be described with particular reference thereto. It will be appreciated, however, that the invention finds application in a variety of applications where an analog pulse is digitally integrated.

Nuclear medicine imaging involves the detection of radiation, such as gamma photons, from a subject under investigation. Gamma photon detectors for use in nuclear medicine imaging typically include a number of photomultiplier tubes coupled to a scintillation crystal. When a gamma photon interacts with the scintillation crystal, a cascade of lower energy photons, typically in the UV band, is emitted, termed an "event." The nearest photomultiplier tubes, in turn, detect the cascade of lower energy photons and each produces an analogous electrical signal in the form of an analog event pulse. A measure of the total energy of the pulse is then used, in combination with that of other pulses, to recreate an image depicting radio isotope distribution in the subject.

The total energy of the pulse is related to its integral, i.e., the area under a plot of energy vs. time. In conventional analog systems, the energy of the pulse is stored as an analog change level which is then measured directly. More recently, analog to digital converters (ADCs) have been used to determine the integral. Rather than measuring the entire output as an analog event, the amplitude of the electrical pulse signal is digitized at some continuous sampling frequency, and the digital samples scanned digitally to generate the integrated value. When an event takes place (as indicated by a separate timing channel), the digital values are summed for a fixed number of samples. This summation forms a representation of the integrated electrical signal.

One difficulty with this approach is commonly referred to as ADC shift error. This arises from the inability to match the start of each pulse accurately to the sampling intervals. The time distribution of gamma photons interacting with the detector is continuous. The ADC samples, however, at a fixed sampling frequency. As a result, the ADC does not sample the electrical signal in a manner that is consistent from pulse to pulse. For a given pulse, the ADC samples can be shifted temporally by $\pm\frac{1}{2}$ of the ADC sample period. This is the ADC shift error.

If the pulse has a pure Gaussian shape, and the total integration period encompasses the entire event period, then the ADC shift error does not result in a variation of the integral. In practice, however, the pulses have a Poisson distribution (generally, a sharp rise followed by a slower decline). While the pulses are often reshaped in the analog domain prior to conversion, they still do not follow a strictly Gaussian distribution. Because of the non-ideal pulse shape, the ADC shift error results in a variation in the determined energy of the pulse.

The distribution of the variation in determined pulse energy adds in quadrature with the underlying variation of the scintillator and photomultiplier tubes. This effectively widens the observed distribution of event energies. Since event energy is a primary means of discriminating good events from bad events, a widening of the observed distribution of good events leads to a widening of the discrimination window, thus increasing the likelihood of contamination by bad events. If the discrimination window is not widened, a loss in sensitivity results. In either case, image quality is reduced.

In conventional gamma cameras, the contributions of the scintillation crystal and photomultiplier tubes to the energy resolution of the camera are greater than that of the ADC shift error, so the ADC shift error does not have a significant effect on the overall resolution. However, as the energy resolution of these components improves, the ADC shift error is making a more significant contribution to the overall resolution.

The amount of variation in the energy distribution (energy resolution) is typically identified by the full width at half maximum (FWHM) of the distribution. For a normal distribution, FWHM relates to the standard deviation of the distribution and is generally calculated by multiplying the standard deviation by $2\times(2\times\ln(2))^{1/2}$ (approximately 2.35). Roughly, it corresponds to the amount of additional error in the pulse, above that of a theoretical pulse with no intrinsic variation (a pure spike), by virtue of the ADC shift error. The extent to which the ADC shift error increases the FWHM is determined by the pulse shape and the sample frequency of the ADC. For example, for a given pulse shape, an integration period (the time between samples) of 20 ns and 5 samples, a FWHM of about 25% may be obtained. This drops to 13%> when the integration period is reduced to 16 ns and to 5% when an integration period of 10 ns is used. Further reductions to about 1.5% are achieved by increasing the number of samples from 5 to 8, at the 10 ns integration period.

While shortening the integration period (reduces the FWHM, some amount of loss will always be present. Additionally, there are practical limits to the frequency of sampling.

The present invention provides a new and improved method and apparatus which overcome the above-referenced problems and others.

In accordance with one aspect of the present invention, a method of reducing errors resulting from a temporal shift between an analog pulse and digital sampling intervals is provided. The method includes digitally sampling the analog pulse at a plurality of spaced sampling intervals to generate a set of digital samples. An integral is determined from the samples in the set. A subset of the samples is selected. A correction factor is determined from the subset of samples. The correction factor is applied to the integral to generate a corrected integral value.

In accordance with another aspect of the invention, a system for reducing temporal shift errors between an analog pulse and a digital sampling interval is provided. The system includes a means for digitally sampling the analog pulse at sampling intervals to generate a set of digital samples, a means for determining an integral of the analog pulse from the set of digital samples, a means for selecting a subset of the digital values, a means for determining a correction factor from the subset of digital samples, and a means for applying the correction to the integral.

In accordance with another aspect of the invention, a system for correcting a signal is provided. The system includes means for sampling the signal at intervals of time to generate a set of test samples. A correction table includes a plurality of codes, each of the codes corresponding to a relationship between samples in a subset of predicted samples. Each of the subsets of predicted samples is selected from a different set of predicted samples. Each of the sets of predicted samples is shifted in time by a time interval which is less than an interval between samples. Each of the codes is associated with a corresponding correction factor. Means are provided for (a) assigning a code to the set of test samples corresponding to a relationship between a subset of the test samples, (b) accessing the correction table to determine a correction factor corresponding to the code, and (c) applying the correction factor to an integration of the set of test samples.

In accordance with another aspect of the invention, a system for reducing temporal shift errors between an analog pulse and a digital sampling interval is provided. The system includes an analog to digital converter for sampling the pulse at intervals of time to generate a set of digital samples. A correction table assigns a correction factor to each of a plurality of codes, each of the codes corresponding to a relationship amongst samples in a subset of calibration samples. Each of the subsets of calibration samples is selected from a different set of calibration samples. Each of the sets of calibration samples are shifted in time relative to a sampling interval. A processor calculates an integral of the pulse from the digital values and the correction factor.

In accordance with another aspect of the invention, a method for correcting a signal is provided. The method includes sampling the signal at intervals of time to generate a set of test samples. A correction table which includes a plurality of codes is accessed. Each of the codes corresponds to a relationship between samples in a subset of predicted samples. Each of the subsets of predicted samples is selected from a different set of predicted samples. Each of the sets of predicted samples is shifted in time, relative to other sets of predicted samples, by a time interval which is less than the interval between samples. Each of the codes is associated with a corresponding correction factor. A code is assigned to the set of test samples corresponding to a relationship between a subset of the test samples. The correction table is accessed to determine a correction factor corresponding to the code. An integration of the set of test samples is performed and the correction factor applied to the integration of the set of test samples.

One advantage of at least one embodiment of the present invention is that the effect of ADC shift error on pulse integration is reduced.

Another advantage of at least one embodiment of the present invention is that it enables a time stamp for a pulse to be created.

Another advantage of at least one embodiment of the present invention is that energy resolution of a gamma camera is improved.

Still further advantages of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating a preferred embodiment and are not to be construed as limiting the invention.

Figure 1:
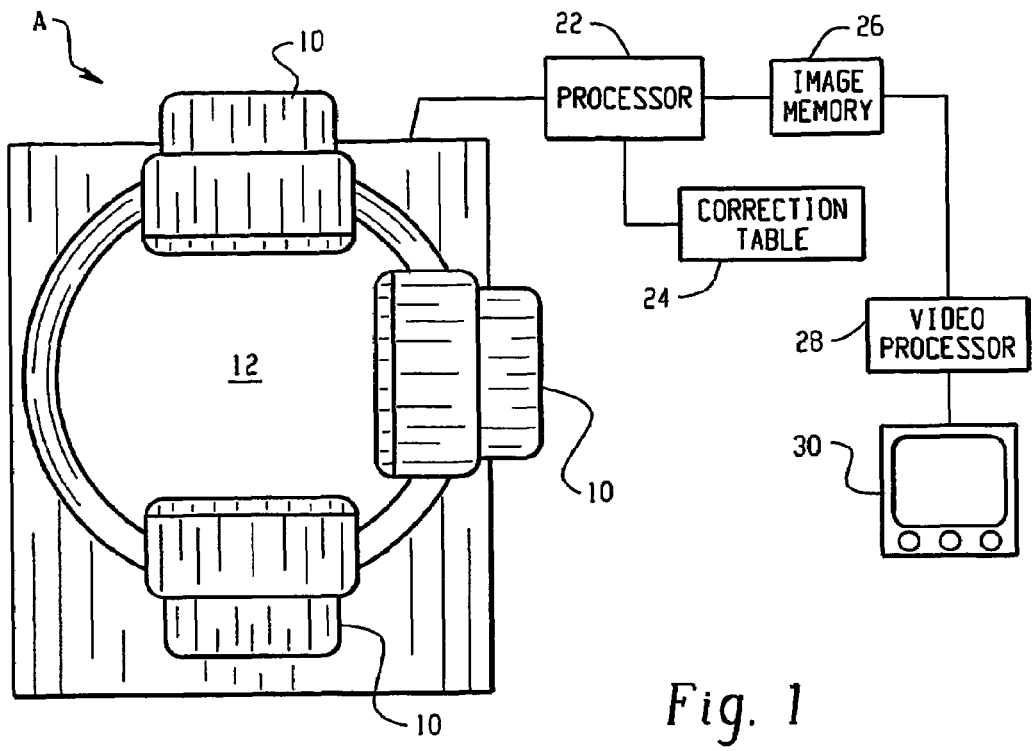
FIG. 1 is a schematic diagram of a gamma camera and energy processing system according to the present invention.
Figure 2:
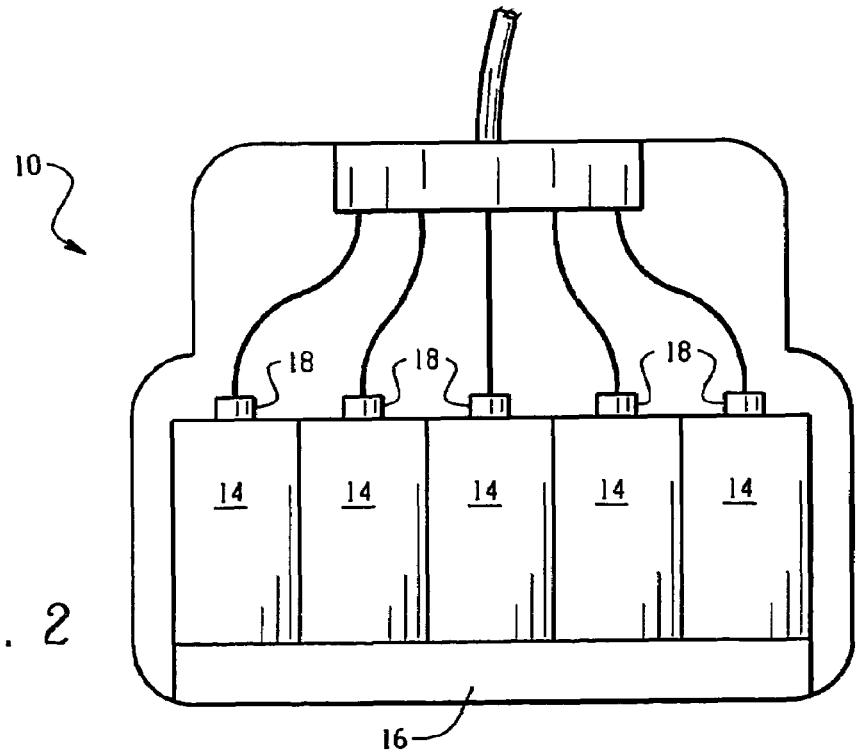
FIG. 2 is an enlarged sectional view of one of the detector heads of FIG. 1; and, FIG. 3 is an exemplary plot of a normalized scintillation pulse, before and after Gaussian shaping.
Figure 3:
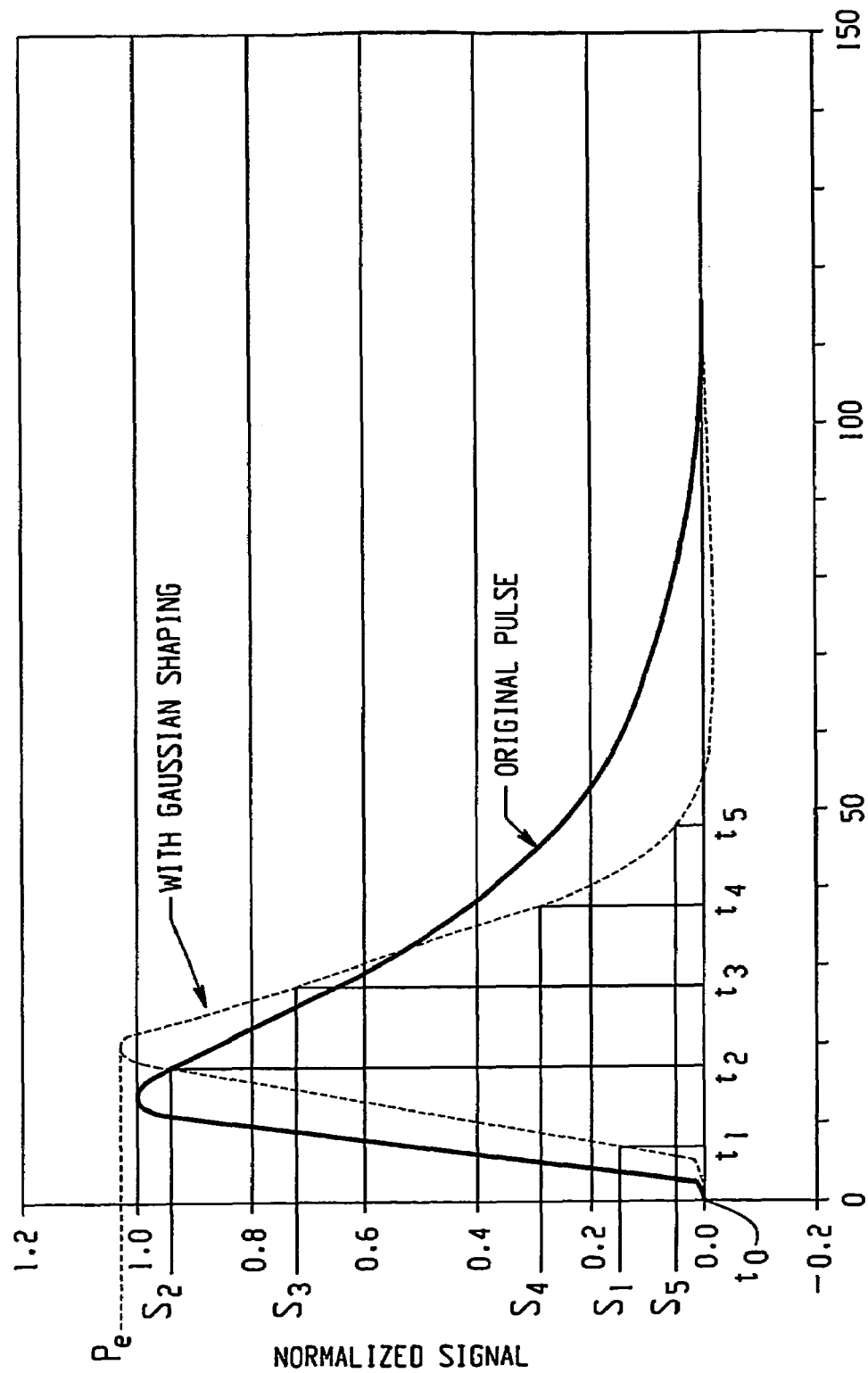

With reference to FIGS. 1 and 2, a nuclear medicine imaging device A, such as a gamma camera, includes one or more detector heads 10 (three in the embodiment illustrated in FIG. 1). Each head detects radiation, such as gamma photons, from a subject in a region 12 under investigation, such as a patient. Typically, the radiation is the result of the decay of a radiopharmaceutical, which decay emits a radiation photon of characteristic energy. Each of the detector heads 10 includes a number of photomultiplier tubes 14 optically coupled to a scintillation crystal 16. A gamma photon interacts with the scintillation crystal generating a pulse of light or scintillation. The event is recognized by a timing channel of an analog to digital converter (ADC) 18. Each photomultiplier tube 14 which views the scintillation produces an analogous electrical signal in the form of an event pulse which is proportional to the amount of received light. The ADC 18 includes sampling software which samples the pulse at a selected frequency. For example, as illustrated in FIG. 3, energy samples $S_1, S_2, S_3, \ldots S_5$ of the pulse at sequential times $t_1, t_2, t_3, \ldots t_{10}$ are taken. The ADC does not detect the exact starting point to of the pulse (i.e., at zero time). Thus, there is an ADC shift error of $t_1-t_0$ which has a value of between 0 (in the rare event that the first sample coincides exactly with the start of the pulse) and $(t_2-t_1)$. Shaping of the pulse is optionally performed prior to sampling of the pulse to create a more Gaussian distribution.

A processor 22 receives the sampled digital pulse energy values, $S_1, S_2, S_3, \ldots S_5$ from the ADC. The processor performs an integration of the samples to obtain an uncorrected value for the total energy of the pulse e.g., $S_1+S_2+S_3+S_4+S_5$. The processor uses a subset of these samples to create a code which correlates with a relationship between the samples in the subset. For example, a plurality of selected consecutive samples e.g., $S_1, S_2$, and $S_3$ is selected to form the subset. The samples in the subset are preferably selected to encompass a portion of the energy distribution in which the energy is changing rapidly, preferably spanning the peak energy $P_e$. The processor 22 accesses a correction algorithm table 24 to obtain a correction factor related to the code. The correction factor is then applied to the integrated value of the energy (e.g., the two are multiplied) to generate a corrected energy value. The effect of ADC shift error on the resulting integrated energies is thereby eliminated or reduced.

The corrected energy values of all tubes who saw the same event are summed and the sum is sent to an image processor and memory 26, which compares the total energy of each scintillation with the characteristic energy of the radiopharmaceutical to identify valid signals. The spatial location of the head, each viewing photomultiplier tube, and the relative amplitude $P_e$ of the signals from viewing photomultiplier for each valid event are reconstructed into a three dimensional image. A video processor 28 withdraws selected portions of the data from the image memory 26 to generate corresponding human-readable displays on a video monitor 30. Typical displays include reprojections, selected slices or planes, and the like.

The correction factor is a function of a predicted relationship between the subset of samples $(S_1, S_2, S_3)$ of the input pulse, the shift error, and its effect on the uncorrected energy value. This predicted relationship is based on an understanding of the expected shape of the pulse. Knowing the general shape of the signal, these relationships can be determined. As the ADC shift error is varied, the relationship changes in a manner which is calculable and which can be encoded. Additionally, the amount of variation in the energy signal can be estimated, relative to the energy signal at an ADC shift error of zero. A ratio of the estimated energy signal at an ADC shift error of j to an estimated energy-signal at an ADC shift error of 0 (zero) forms a set of correction factors. These can be selected and applied, based on the encoded relationship between the subset of samples in an actual pulse.

To generate the algorithm or look-up table 24, a set of correction factors is determined from a predicted pulse and the corresponding relationship between a selected set of samples is encoded.

The correction factors are determined from a predicted energy distribution curve of a pulse. The predicted pulse is one which is anticipated to be similar in shape to an actual pulse to be integrated. The predicted pulse distribution curve may be based on a priori knowledge of the pulse shape. In one method, a gated integrator is employed with an analog system to create a plot of an actual energy pulse from the nuclear medicine device A or a similar device. The gated integrator allows a pulse to be analyzed with is little or no sample error. Other methods of creating a predicted energy distribution curve are also contemplated, including sampling a pulse with an ADC at very short frequencies, or trial and error methods. In one trial and error method, a proposed plot is created, e.g., a Poisson or Gaussian distribution. A set of correction factors is determined from the curve. The correction factors are applied to a plurality of real pulses. It is then determined whether an improvement in energy resolution is achieved. This procedure may go through many iterations, each iteration evaluated to determine whether it improves the energy resolution.

In one embodiment, the correction factors and associated values for each of a plurality of shift errors are determined for the predicted pulse, integration period, and total number of samples, as follows:

1. A set of energy samples (e.g., $S_1, S_2, S_3, \ldots S_{10}$) of the predicted pulse at times ($t_1, t_2, t_3, \ldots t_{10}$) are taken for a plurality of shift errors j from 0 to the integration period $p=(t_2-t_1)$. These samples may be taken from the raw pulse energies or, as illustrated in FIG. 3, after smoothing of the curve to achieve a more Gaussian distribution. The shift errors are preferably equally spaced in time over the range of possible shift errors. For example, if the integration period p is J nanoseconds (ns), correction factors for shift errors of 1, 2, 3, ... J ns are obtained. The more closely spaced in time the shift errors, the more accurate the correction will tend to be. However, for practical purposes, determining correction factors for about 6-25 spaced shift errors is generally sufficient. For example, for sampling at 10 ns intervals, selecting shift errors of 0, 1, 2, 3, 4, 5, 6, 7, 8, 9, and 10 ns is sufficient to provide a substantial improvement in FWHM, i.e., the energy resolution of the nuclear medicine device. The integration period p is the same for both the determination of correction factors and for the sampling of an actual pulse.

2. The predicted curve is integrated analytically at each of the shift errors to obtain energy values $E_0$ to $E_p$.

3. A subset of N samples is selected from the samples for each integration. For example, sequential samples $S_1, S_2, S_3$ of samples $S_1, S_2, S_3 S_{10}$ are selected (N=3). The selected samples in the subset are the same as those which will later be used for the correction of an actual pulse. The samples in the subset may be consecutive or non-consecutive. The samples in the subset are preferably in a region of rapidly changing energy, spanning or adjacent to the peak. While all samples in the set could, in theory, be selected (and thus, for the purposes of this application be considered a subset), it is not necessary to use all samples, and could result in an unmanageable amount of data for the processor to handle. In general, about two to four samples in the subset is generally sufficient.

4. Each sample in the subset is normalized to the maximum sample in the integration. For example, the highest energy is given a value of 1 and the samples in the subset are assigned a value of the ratio of the energy of the sample to the energy of the highest sample.

5. The value of each normalized sample is encoded as an M-bit value, where M is preferably between 3 and 6. The value of M will depend, in part, on the data handling capacity of the processor. A value of 4 provides an adequate range of code values while being amenable to current processor capabilities. For example, the values are all multiplied by a common factor (15 in the case of a 4-bit code), and expressed as an integer. The integer is then converted to binary code.

6. The N M-bit code values from each subset are concatenated to form an N×M bit code $C_j$ (3×4=12 bit code, for example) that represents the relationship between the sample subset for that integration at ADC shift error j. For example, if the normalized and factor multiplied code values of a subset are 0, 8, and 15, when converted to a binary, twelve bit code, they are expressed as 0000 1000 1111 (i.e., equivalent to the number 143 in the decimal system).

7. Correction factors are assigned for each of the plurality of shift errors j between 0 and the integration period $p=(t_2-t_1)$. Each correction factor is determined from the ratio of the integrated energy of the pulse at the shift error to the integrated energy of the pulse at a shift error of 0, i.e., Ratio $R_j = E_p/E_j$ The correction factor has a value of 1 at zero shift error. As the shift error varies, the value of the correction factor changes, but not generally in a linear fashion.

8. Using the codes from step 6 and the ratios from step 7, the correction table 24 is generated, as illustrated in Table 1.

TABLE 1

| Shift Error | Code | Correction factor |
|---|---|---|
| 0 | $C_0$ | $R_0 = 1$ |
| . | . | . |
| . | . | . |
| . | . | . |
| J | $C_j$ | $R_j$ |

9. Where codes $C_0$ to $C_j$ do not fill out the entire N×M bit codespace, the correction table is completed by assigning correction factors based on the nearest defined code or interpolating correction factors from two or more nearest defined codes.

Once the correction table 24 has been generated, it can be fed into the processor, if it has been created separately. The correction table 24 can then be applied to actual pulses.

Application of the correction table to an actual pulse is done on an event by event basis according to the following steps.

1. A set of energy samples $S_1, S_2, S_3, \ldots S_{10}$ of the actual "test" pulse at times $t_1, t_2, t_3, \ldots t_{10}$ is taken. These samples may be taken from the raw pulse energies or, as illustrated in FIG. 3, after smoothing of the curve to achieve a more Gaussian distribution.

2. The maximum energy value of the set of energy samples from the test pulse is determined.

3. From the set of energy samples, a subset of energy samples is selected. The same subset as was used to form the correction table is used, e.g., samples $S_1, S_2, S_3$ of the test pulse at times $t_1, t_2, t_3$.

4. The subset sample values are normalized to the maximum value in the set of samples, as described for forming the correction table.

5. The subset is encoded as described in steps 5 and 6 above for the correction table to generate a N×M-bit code $C_j$.

6. Using the correction table, the generated code $C_j$ is matched by the processor to the corresponding correction factor. Where the code is not listed in the correction table, the next lowest numerical code is selected and the corresponding correction factor for that code is read from the table.

7. The integrated result from the entire set of samples is multiplied by the correction factor to generate a corrected energy value. In the case where piling up occurs (two or more pulses overlap such that the trailing edge of one pulse overlaps the leading edge of the next), some of the samples in the set may be corrected to account for the effects of piling up prior to integration.

The correction of the energy value in this way increases the resolution possible with the nuclear medicine device A by reducing one potential source of error. It may be used in conjunction with other error reducing methods, such as decreasing the integration period, for example, from about 20 ns, as currently used, to about 10 ns. Additionally, the technique allows scintillation crystals with higher energy resolution to be used without the ADC shift error overwhelming the resolution benefits gained. For example, in place of conventional sodium iodide as the scintillation crystal, which has an energy resolution of only about 10%, lanthanum bromide, with an energy resolution of about 3%, may be used as the scintillation crystal, improving the energy resolution of the nuclear medicine system.

In addition to correcting the integration of the energy, the correction table is also optionally used to determine the start time of the pulse. Knowing the code value, the corresponding ADC shift can be read from the table. By subtraction of the ADC shift from the actual time at which the first sample was taken, the time at which the pulse commenced is determined. Creating a time stamp for the pulse in this way finds application, for example, in positron emission tomography (PET) systems, to create a time to digital conversion.

Without intending to limit the scope of the invention, the following theoretical specific embodiment demonstrates the application of the correction method.

Consider that a pulse of the shape described in FIG. 3, after Gaussian shaping, is sampled. An integration period of 10 ns with 5 samples is used. Without application of the correction table, this results in a FWHM of 5%.

To create the correction table, the pulse is analytically integrated with ADC shift errors of 0-10 nS, as shown in Table 2 for each of the five samples. The integral, $E_j$, is the sum of the energies for the five samples at the particular shift error. It can be seen that this value varies from about 2.22 to 2.35, depending on the shift error. The maximum energy value in the set is also identified.

Subsets comprising the first three samples $S_1$, $S_2$, $S_3$ are used from each ADC shift error to generate a code. Specifically, the $S_1$, $S_2$, $S_3$ values are normalized to the maximum value at each shift error. For example, the maximum value for the zero shift error set $S_4$=0.894791. Thus, the normalized value of $S_3$ is 0.865768/0.894791=0.967564. Each of the normalized values is then multiplied by a common factor: 15 in the present example. Thus, for the example given, 15×0.967564=14.51. This is rounded down to the nearest integer=14, which is equivalent to the 4 bit code 1110.

The codes for the three values are then concatenated to form a 12 bit code. In the example, the corresponding values for $S_1$ and $S_2$ in the subset are both zero, so the concatenated code is 000000001110, equivalent to a decimal code of 14. This is the code assigned to a shift error of 0. Corresponding codes for each of the other shift errors are then determined, as shown in Table 3. The correction factors are determined from $E_0/E_j$. In the first subset, for example, $E_j=E_0$, so this value is 1.

TABLE 3

| Shift Error, j | $S_1$ | $S_2$ | $S_3$ | Code | Correction Factor |
|---|---|---|---|---|---|
| 0 | 0 | 0 | 1110 (14) | 1110 (14) | 1 |
| 1 | 0 | 0 | 1111 (15) | 1111 (15) | 0.99762 |
| 2 | 0 | 0001 (1) | 1111 (15) | 00011111 (31) | 0.994129 |
| 3 | 0 | 0010 (2) | 1111 (15) | 00101111 (47) | 0.987568 |
| 4 | 0 | 0011 (3) | 1111 (15) | 00111111 (63) | 0.977668 |
| 5 | 0 | 0101 (5) | 1111 (15) | 01011111 (95) | 0.965899 |
| 6 | 0 | 0110 (6) | 1111 (15) | 01101111 (111) | 0.954758 |
| 7 | 0 | 1000 (8) | 1111 (15) | 10001111 (143) | 0.946653 |
| 8 | 0 | 1010 (10) | 1111 (15) | 10101111 (175) | 0.943046 |
| 9 | 0 | 1100 (12) | 1111 (15) | 11001111 (207) | 0.944038 |
| 10 | 0 | 1110 (14) | 1111 (15) | 11101111 (239) | 0.948296 |

This provides the correction table 24, which in the illustrated embodiment, is represented by Table 4.

TABLE 4

| Shift Error, j | Code | Correction |
|---|---|---|
| 0 | 14 | 1 |
| 1 | 15 | 0.99762 |
| 2 | 31 | 0.994129 |
| 3 | 47 | 0.987568 |
| 4 | 63 | 0.977668 |
| 5 | 95 | 0.965899 |
| 6 | 111 | 0.954758 |
| 7 | 143 | 0.946653 |

TABLE 2

| ADC Shift error, j | Integral $E_j$ | $S_1$ | $S_2$ | $S_3$ | $S_4$ | $S_5$ |
|---|---|---|---|---|---|---|
| 0 | 2.2163242 | 0 | 0.020316 | 0.865768 | 0.894791 | 0.435449 |
| 1 | 2.2216111 | 0 | 0.047723 | 0.930051 | 0.851284 | 0.382553 |
| 2 | 2.294135 | 0 | 0.094291 | 0.977576 | 0.80574 | 0.351807 |
| 3 | 2.2442245 | 0 | 0.0162645 | 1.008819 | 0.75925 | 0.31351 |
| 4 | 2.2669492 | 0 | 0.0251724 | 1.024902 | 0.712473 | 0.277851 |
| 5 | 2.2945707 | 0 | 0.356621 | 1.027339 | 0.665669 | 0.244942 |
| 6 | 2.3213471 | 2.04E–05 | 0.0469779 | 1.01782 | 0.618892 | 0.214835 |
| 7 | 2.3412209 | 0.000284 | 0.0583147 | 0.0998076 | 0.572198 | 0.187517 |
| 8 | 2.35017858 | 0.001748 | 0.689921 | 0.969837 | 0.525792 | 0.162878 |
| 9 | 2.3477059 | 0.006918 | 0.785175 | 0.934842 | 0.0480043 | 0.140728 |
| 10 | 2.337165 | 0.020316 | 0.865768 | 0.894791 | 0.0435449 | 0.120841 |

TABLE 4-continued

| Shift Error, j | Code | Correction |
|---|---|---|
| 8 | 175 | 0.943046 |
| 9 | 207 | 0.944038 |
| 10 | 239 | 0.948296 |

The correction table is then entered into the processor 22 of the nuclear medicine device A, to be used on actual test pulses which are sampled at the same integration period and number of samples.

To apply the correction table, the set of samples from each event is examined to determine the maximum sample. Samples in subset $S_1$, $S_2$, $S_3$ are then normalized to the maximum sample and 4-bit codes are generated. The 4-bit codes are concatenated to a 12 bit code and this is used to index the correction table. The resulting correction factor is multiplied by the integration of the set of samples to form the corrected energy value.

In the illustrated example, the value of $S_1$ is always zero. Thus, it does not affect the relationship between the three samples in the subset. Where this is the case, a different subset, such as $S_2$, $S_3$, $S_4$ could be used, such that each of the three values plays a part in determining the relationship.

To test the process, the test pulse was analytically integrated in this manner a thousand times using ADC shift errors that are uniformly distributed between 0 and the integration period (10 ns in this case). A partial list of those integrations is shown in Table 5.

The resulting FWHM for the corrected data is 0.35%. This is a substantial improvement over the 5% FWHM without correction. It will be noticed that the method works even for negative ADC shift errors, i.e., those where the first sample was taken prior to the actual start time of the pulse.

The invention has been described in terms of correction of energy values in an energy pulse from a gamma photon detector used in nuclear medicine imaging. This includes Single Photon Emission Planar Imaging, Single Photon Emission Computed Tomography (SPECT), and Positron Emission Tomography (PET) systems. It will be appreciated that energy pulses from other sources may be similarly corrected for errors due to difficulties in beginning the sampling a uniform time interval after the start of the pulse. The application may also extend generally to any situation where a continuously randomly occurring signal of limited duration and known shape is sampled by a fixed frequency ADC and where the integral of the sampled signal is desired. The invention finds wider application in treating data obtained from other sources where a variable is plotted against a determinate such as electrical current vs. time, and where the variable follows a generally predictable variation vs. the determinate. Specific examples include thermal energy vs. time, concentration changes vs. time, energy vs. wavelength, and the like.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

TABLE 5

| ADC Shift error, j | $S_1$ | $S_2$ | $S_3$ | $S_4$ | $S_5$ | Integration $E_j$ (Uncorrected) | Code | Correction factor | Integration $E_j$ (Corrected) |
|---|---|---|---|---|---|---|---|---|---|
| 6 | 0.000 | 0.048 | 0.930 | 0.851 | 0.393 | 2.222 | 27 | 0.998 | 2.216 |
| 4 | 0.007 | 0.785 | 0.935 | 0.480 | 0.352 | 2.348 | 244 | 0.948 | 2.226 |
| −3 | 0.000 | 0.094 | 0.978 | 0.806 | 0.352 | 2.229 | 38 | 0.994 | 2.216 |
| −1 | 0.000 | 0.866 | 1.025 | 0.712 | 0.278 | 2.267 | 73 | 0.978 | 2.216 |
| −1 | 0.000 | 0.866 | 1.025 | 0.712 | 0.278 | 2.267 | 73 | 0.978 | 2.216 |
| −3 | 0.000 | 0.094 | 0.978 | 0.806 | 0.352 | 2.229 | 38 | 0.994 | 2.216 |
| 5 | 0.020 | 0.866 | 0.895 | 0.435 | 0.121 | 2.337 | 330 | 0.948 | 2.216 |
| 0 | 0.000 | 0.357 | 1.027 | 0.666 | 0.245 | 2.295 | 98 | 0.966 | 2.216 |
| −3 | 0.000 | 0.094 | 0.978 | 0.806 | 0.352 | 2.229 | 38 | 0.994 | 2.216 |
| −3 | 0.000 | 0.094 | 0.978 | 0.806 | 0.352 | 2.229 | 38 | 0.994 | 2.216 |
| −4 | 0.000 | 0.048 | 0.930 | 0.851 | 0.393 | 2.222 | 27 | 0.998 | 2.216 |
| −2 | 0.000 | 0.163 | 1.009 | 0.759 | 0.314 | 2.244 | 53 | 0.998 | 2.216 |
| 2 | 0.000 | 0.583 | 0.998 | 0.572 | 0.188 | 2.341 | 155 | 0.947 | 2.216 |
| −3 | 0.000 | 0.094 | 0.978 | 0.806 | 0.352 | 2.229 | 38 | 0.994 | 2.216 |
| 3 | 0.002 | 0.690 | 0.970 | 0.526 | 0.163 | 2.350 | 188 | 0.943 | 2.216 |
| 4 | 0.007 | 0.785 | 0.935 | 0.480 | 0.141 | 2.348 | 244 | 0.948 | 2.226 |

Having thus described the preferred embodiment, the invention is now claimed to be:

1. A method of reducing errors resulting from a temporal shift between an analog pulse and digital sampling intervals, the method comprising:

generating a correction table which assigns a correction factor for a plurality of codes, each of the codes corresponding to a relationship between a subset of digital samples in a calibration signal which is similar in shape to the analog pulse, generating the correction table including for a plurality of calibration sample sets in which calibration pulses are shifted in time relative to a sampling interval:

sampling the calibration pulses at a plurality of spaced intervals to generate a set of calibration digital samples;

determining an integration which is a function of the digital samples in the selecting the subset of the digital samples;

determining a correction factor which relates the integration of the set of samples to an integration of a set of digital samples in which the first sample is taken at a fixed point of reference; and assigning a code to the subset of digital samples which relates to a relationship amongst the samples in the subset and assigning the correction factor to the code;

digitally sampling the analog pulse with an analog to digital converter at a plurality of spaced sampling intervals to generate a set of digital samples;

determining an integral from the samples in the set;

from the correction table and the subset of the set of digital samples, determining the correction factor corresponding to the subset of digital samples;

applying the correction factor to the integral to generate a corrected integral value;

restructuring an image from a plurality of the analog pulses and the corrected integral values; and display the reconstructed image on a display device.

2. The method according to claim 1, further including:

converting a photon of radiation into a scintillation; and converting the scintillation into the analog pulse.

3. The method according to claim 1, further including:

smoothing the analog pulse to reduce variation from a Gaussian distribution prior to the digital sampling.

4. The method according to claim 1, wherein the digital sampling is at uniformly spaced time intervals.

5. The method according to claim 1, wherein there are at least four samples in the set of digital samples.

6. The method according to claim 1, wherein the step of determining an integral includes summing the samples in the set.

7. The method according to claim 1, wherein selecting the subset includes selecting at least two samples in the set.

8. The method according to claim 1, wherein the step of determining a correction factor includes:

concatenating the subset of digital samples; and using the concatenation to form a correction factor look up table.

9. The method according to claim 8, further including:

normalizing each of the samples in the subset to a maximum sample in the set of samples to form a normalized sample; and multiplying each of the normalized samples by a factor which is the same for all samples in the subset.

10. The method according to claim 1, further including: determining a start time of the analog pulse from the subset of digital samples.

11. The method according to claim 1, wherein the fixed point of reference is a start of the sampling interval.

12. The method according to claim 1, wherein assigning a code to the subset of predicted samples includes:

for each of the samples in the subset, converting the sample to an M-bit code; and concatenating the M-bit code to an M×N bit code, where N is the number of samples in the subset.

13. The method according to claim 12, wherein converting the samples to an M-bit code includes:

normalizing each of the sample to a maximum sample in the set of predicted samples; and multiplying the normalized sample by a factor which is the same for all samples in the subset of predicted samples.

14. A nuclear camera comprising:

at least one detector head which generates energy pulses in response to received radiation; and a processor for integrating the pulses wherein the processor carries out the actions of:

digitally sampling an analog pulse at a plurality of temporally spaced sampling intervals to generate a set of digital samples, the sampling starting at a temporal delay after a start of the analog pulse;

determining an integral from energy of the pulse by integrating the samples in the set, the energy including an error attributable to the temporal delay;

determining a correction factor corresponding to at least a portion of the samples in the set; and applying the correction factor to the integrated samples to generate a corrected energy value.

15. A system for reducing temporal shift errors between an analog pulse and a digital sampling interval comprising:

a means for digitally sampling the analog pulse at temporal sampling intervals to generate a set of digital samples;

a means for determining an energy of the analog pulse by integrating the set of digital samples;

a means for selecting a subset of the digital values;

a means for determining a correction factor from the subset of digital samples; and a means for correcting the determined energy by applying the correction factor to the integral of the set of digital samples.

16. The system according to claim 15, wherein the means for sampling includes an analog to digital converter.

17. A system for reducing temporal shift errors between an analog pulse and a digital sampling interval comprising:

an analog to digital converter which samples the pulse at intervals of time to generate a set of digital values, the sampling starting after a delay of up to 1 of the intervals of time;

a correction table of correction factors based on a shape of the pulse and relationships amongst samples in subsets of calibration samples, each of the subsets corresponding to one of a plurality of delays; and a processor which calculates an area under the pulse from the digital values and a one of the correction factors corresponding to the subset of the digital values of the pulse.

18. The system of claim 17, further including:

a source of radiation; and a detector which detects the radiation.

* * * * *